United States Patent

Dobler et al.

[11] Patent Number: 5,263,258
[45] Date of Patent: Nov. 23, 1993

[54] MEASURING DEVICE FOR DETERMINATION OF AN ANGLE OF ROTATION

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 923,808
[22] PCT Filed: Jan. 18, 1992
[86] PCT No.: PCT/DE92/00028
§ 371 Date: Aug. 27, 1992
§ 102(e) Date: Aug. 27, 1992
[87] PCT Pub. No.: WO92/14121
PCT Pub. Date: Aug. 20, 1992

[30] Foreign Application Priority Data

Feb. 12, 1991 [DE] Fed. Rep. of Germany ....... 4104210
Jul. 6, 1991 [DE] Fed. Rep. of Germany ....... 4122478

[51] Int. Cl.⁵ .......................... G01D 5/22; G01B 7/30
[52] U.S. Cl. ..................................... 33/1 N; 33/1 PT
[58] Field of Search .......................... 33/1 N, 1 PT, 534

[56] References Cited
FOREIGN PATENT DOCUMENTS 0365758  5/1990 European Pat. Off. .
3824535  1/1990 Fed. Rep. of Germany .
3916864 11/1990 Fed. Rep. of Germany .
4001544  7/1991 Fed. Rep. of Germany .
4040932  2/1992 Fed. Rep. of Germany ....... 33/1 N
  88317  6/1982 Japan .................................. 33/1 N
2240185  7/1991 United Kingdom .

Primary Examiner—William A. Cuchlinski, Jr.
Assistant Examiner—C. W. Fulton
Attorney, Agent, or Firm—Michael J. Striker

[57] ABSTRACT

A measuring device for determining the angle of rotation has a coil body (11) having two cores (12, 13) which are approximately semicircular in cross section and are offset relative to one another in the axial direction. Further the cores (12, 13) are offset by 180° relative to one another in the radial direction. A coil (20, 21) in a working connection with a measuring part (22) of electrically conductive and/or ferromagnetic material is wound on each of these cores (12, 13). The measuring part (22) is constructed as a sleeve segment and covers half the circumference of the coil body (11). The measuring part (22) is directly connected by a carrier (23) with the shaft (17) whose rotational movement is to be determined. The shaft (17) is supported in the coil body (11) along a relatively long distance. This has the advantage that the complete sensor can be mounted at a holding device. Accordingly the costly adjustment of the sensor during final assembly is dispensed with.

17 Claims, 3 Drawing Sheets

MEASURING DEVICE FOR DETERMINATION OF AN ANGLE OF ROTATION

BACKGROUND OF THE INVENTION

The present invention relates to a measuring device for determining the angle of rotation. A measuring device for contactless determination of a rotation angle of a shaft is known comprising two bodies which are moved relative to each other and sensor coils whose inductance and alternating current resistance values are varied by changes in the relative positions of regions of electrically conductive and/or ferromagnetic material and the coils due to rotation of the shaft. In a measuring device known from DE-OS 38 24 535.3 a central longitudinal groove is formed in a cylindrical coil body proceeding from one front side. Accordingly two cores are formed which are semicircular in cross section, a coil being wound around each core. A measuring part which provides damping is produced from electrically conducting and/or ferromagnetic material. It surrounds at least part of the axial length of the external coil regions. Alternating current flows through the coils. As a result of the relative rotation of the measuring part, the degree to which the measuring part and the coils overlap changes in the opposite direction so that the alternating current resistance of the coils is varied in a corresponding manner. The coils must be positioned exactly relative to the measuring sleeve when assembling the sensor, which is relatively costly.

Further, a measuring device for contactless measurement of a change in path and/or angle is known from the subsequently published DE-OS 40 01 544.0 in which the coil bodies are offset in the axial direction of the measuring device and arranged so as to be offset at an angle relative to one another in the radial direction corresponding to the quantity of coil bodies. The coils are wire-wound coils and alternating current likewise flows through them.

SUMMARY OF THE INVENTION

It is an object of the present invention to provide an improved measuring device for contactless determination of a rotation angle of a shaft relative to a stationary body.

According to the present invention, the measuring device for contactless determination of a rotation angle of a shaft comprises a coil body having an axial direction and a plurality of cores offset from each other in the axial direction, a shaft rotatably supported in the coil body, the coil body providing bearing means for the shaft, and having a rotation angle relative to the coil body; at least one electrically conducting coil arranged on each of the cores; and a measuring part at least partially surrounding, spaced from and adjacent to an outer surface of the coil body so as to extend circumferentially at least half way around the coil body. The measuring part is connected nonrotatably with the shaft so that the measuring part rotates relative to the coil body when the shaft rotates. The measuring part is at least partially made from an electrically conductive and/or ferromagnetic material so that the measuring part induces variations in the inductance and the alternating current resistance of the coils when the measuring part moves relative to the coil body, the variations being useful for determining a rotation angle change.

Alternatively, the measuring device comprises a coil body having an axial direction, a shaft rotatably supported in the coil body, the coil body providing bearing means for the shaft, and having a rotation angle relative to the shaft; a plurality of electrically conducting coils on the coil body spaced from each other in the axial direction; a damping body mounted nonrotatably on the shaft and having a plurality of cores offset from each other in the axial direction, each of the cores being positioned adjacent and spaced from at least one of the coils on the coil body; and a shielding plate located to partially shield the cores from the coils. The damping body is connected nonrotatably with the shaft so that the damping body moves relative to the coil body when the shaft rotates and the damping body is at least partially made from an electrically conductive and/or ferromagnetic material so that the damping body induces variations in the inductance and the alternating current resistance of the coils when the measuring part moves relative to the coil body, the variations being useful for determining a rotation angle change.

In contrast, the measuring device in accordance with the present invention has the advantage that the coil body forms a bearing of relatively long construction in the axial direction for the rotating shaft with a damping part connected to the rotating shaft so as to be fixed with respect to rotation relative to it. Accordingly, the recess of a sliding bearing or of two adjacently arranged ball bearings is possible. The shaft is supported in the coil body itself, so that the complete sensor can be mounted, e.g. in a holding device, in a housing or on a printed circuit board. The costly adjustment of the sensor coils is accordingly dispensed with in application, i.e. in the final assembly. A simple construction arrangement enables an axial support which is as long as possible and can be used in a simple manner in series-manufactured products. Due to the long axial support a tilting or wobbling movement is no longer possible. The distance between the coil surface and the damping part is constant during the operation of the measuring device. A relatively accurate measurement signal is accordingly obtained which cannot be modified in a misleading manner by construction measures. Both windings can be carried out simultaneously with the aid of a single winding machine due to the axial offsetting of the two cores of the coil bodies. When the measuring part covers the coil body over an angular area of more than 180°, particularly in an area of 200°-220°, the measuring sensitivity of the sensor increases. The dimensional stability of the measuring part is improved.

BRIEF DESCRIPTION OF THE DRAWING

The objects, features and advantages of the present invention will now be illustrated in more detail by the following detailed description, reference being made to the accompanying drawing in which:

FIG. 7 is a top view of another embodiment of the device shown in FIG. 1 similar to FIG. 1.

DETAILED DESCRIPTION OF THE PREFERRED EMBODIMENTS

Figure 1:
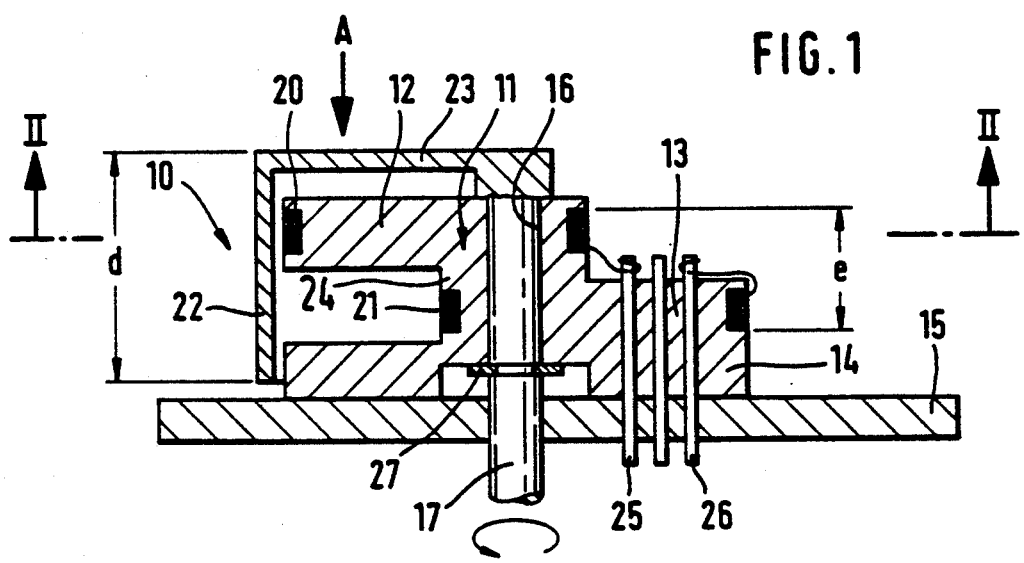
FIG. 1 is a longitudinal cross-sectional view through a measuring device for determining a rotation angle according to the invention.

A sensor of measuring device 10 according to the invention having a coil body 11 which is preferably produced from electrically nonconductive material is shown in FIG. 1. This coil body has two cores 12, 13 which are arranged so as to be displaced from each other or offset in the axial direction, one core 13 having a fastening flange 14. The coil body 11 is mounted on a stationary printed circuit board 15 with the aid of this fastening flange 14. A continuous bore hole 16 is provided in the coil body 12 and forms a bearing B for a shaft 17 whose rotational movement is to be determined. The shaft 17 has a rotation axis SA defining the axial direction. But the shaft 17 can also be connected with a structural component part, not shown, so that the rotational movement of this structural component part is also determined.

The two cores 12, 13 which are arranged so as to be offset in the axial direction have an approximately semicircular cross section or are approximately D-shaped in cross section. However, other core shapes are also conceivable. The cores 12, 13 must at least partially surround the shaft 17 in the bore hole 16.

Further, the cores 12, 13 are arranged so as to be offset or displaced relative to one another in the radial direction by 180° so that the wall which is only slightly bent in the D-shaped construction of the cores 12, 13 can embrace the axis of the coil body 11. A wire coil 20, 21 is wound around each core 12, 13 in the circumferential direction of the coil body 11. The axially offset cores 12, 13 make it possible for both coils 20, 21 to be wound with a single winding machine in a very simple manner with regard to manufacturing technology without considerable additional modification. In particular, both coils 20, 21 can be wound simultaneously so that only one work operation is necessary.

A measuring part 22 of electrically conductive (ferromagnetic and/or nonferromagnetic material) or ferromagnetic material is arranged around the coil body 11 at a slight distance. The measuring part 22 is constructed as a sleeve segment and covers half the circumference of the coil body 11 as seen approximately in the circumferential direction. The axial length d of the measuring part 22 should have at least the width e of the coils 20, 21 and of the region 24 of the coil body 11 situated between the coils. If the length d is greater than length e, few, if any, axial adjustment errors of the measuring part 22 can occur. The measuring part 22 is connected with the shaft 17 via a disk-shaped or, as shown in more detail in FIG. 3, by a rod-shaped carrier 23. This arrangement enables a connection of the measuring part 22 with the shaft 17 via the carrier 23, the shaft 17 being supported in a particularly advantageous manner over a relatively long distance in the coil body 11. Scarcely any fluctuations in the distance between the inside of the measuring part 22 and the surface of the wire-wound coils 20, 21 are possible due to this construction.

The advantage of using a rod-shaped carrier 23 consists in that the measurement signal is not influenced or, if so, only negligibly by axial movements of the carrier 23 as will be clear from the following explanation of the manner of operation. Further, also for this reason the carrier 23 has a relatively small width. In the case of a disk-shaped carrier shown in FIG. 7, windows w can also be provided in it to reduce the measurement error caused by axial movement. The disk solution has the advantage that it can be produced from one piece with the measuring part 22 in a simple manner. Moreover it is possible to produce the carrier 23 from electrical insulating material. The coils 20, 21 are connected with the printed circuit board 15 and evaluating electronics, which are not shown in more detail, by connection pins 25, 26. The coil body 11 is retained axially on the shaft 17 by a retaining ring 27.

In the initial position, the measuring part 22 is aligned in such a way that it covers both coils 20, 21 with the same circumferential surface area. The sensor 10 can work according to the induction and/or eddy current principle. In both cases, alternating current flows through the coils 20, 21. The measuring part 22 is rotated around the coil body 11 and moved around a desired angular area for the purpose of measuring. The eddy current principle is explained in the following. A magnetic alternating field develops at the coils 20, 21 which causes eddy currents on the metallic surface of the measuring part 22. The greater the surface of the measuring part 22 penetrated by the magnetic field, the more eddy currents are generated. Further, the magnitude of generated eddy currents is dependent on the material used for the measuring part 22 and on the distance of the coil 20 or 21 from the inside of the measuring part 22. The alternating current resistance of the coils changes as a result of the eddy currents produced on the measuring part 22, which is used to obtain a measurement signal. Since the coil inductance is likewise reduced as the formation of eddy currents increases, this change in inductance can also be used for obtaining a measurement signal (coil inductance evaluating method). During the rotational movement of the measuring part 22 the surface area of the measuring part 22 associated with the respective coil 20 and 21, respectively, changes in the opposite direction. Accordingly, the surface area of the measuring part 22 associated with the coil 20 is increased e.g. by the same amount as it is reduced relative to the other coil 21. The two coils 20, 21 are joined in a Wheatstone half-bridge circuit in the coil alternating current resistance evaluating method. The measurement errors which occur simultaneously and act in opposite directions are accordingly compensated for in the coils 20, 21. If the coils 20, 21 are wound from wire, the coils 20, 21 can be operated in a broad frequency range of alternating current. This range can extend from 5 kHz to 5 MHz for example. For this purpose it is sufficient to change the diameter of the coils 20, 21 and/or the number of turns of the windings of the coils 20, 21 (e.g. by varying the number of coil positions).

If the coils 20, 21 are fed by a high carrier frequency $f_T$ (frequency of the eddy current flowing through the coil) of e.g. 1 MHz, the propagation of the eddy currents is heavily determined by the skin effect. This means that the produced electromagnetic alternating field of the coils 20, 21 is only formed on the outer layer of the surface of the measuring part 22 facing the coils. On the other hand, if the coils 20, 21 are fed by an alternating current with a very low carrier frequency $f_T$ of e.g. <5 kHz, the magnetic alternating field produced by the coils penetrates more deeply into the surface of the measuring part 22 facing the coils. The depth of penetration of the eddy currents also depends on the material of the measuring part 22. The wall thickness of the measuring part 22 can be varied based on the different carrier frequencies.

Instead of the eddy current principle described above the inductive measurement principle is suitable as a basis for measurement. For this purpose only the measuring part 22 need have ferromagnetic material. To this end the measuring part 22 can be produced from ferromagnetic material or have a ferromagnetic layer.

When the most important parameters (level of carrier frequency, material of the measuring part 22) are adapted in a corresponding manner, the alternating current resistance can increase with extensive overlapping of the coil surface of the sensor coil in the inductive method, while it decreases in the eddy current method.

Figure 4:
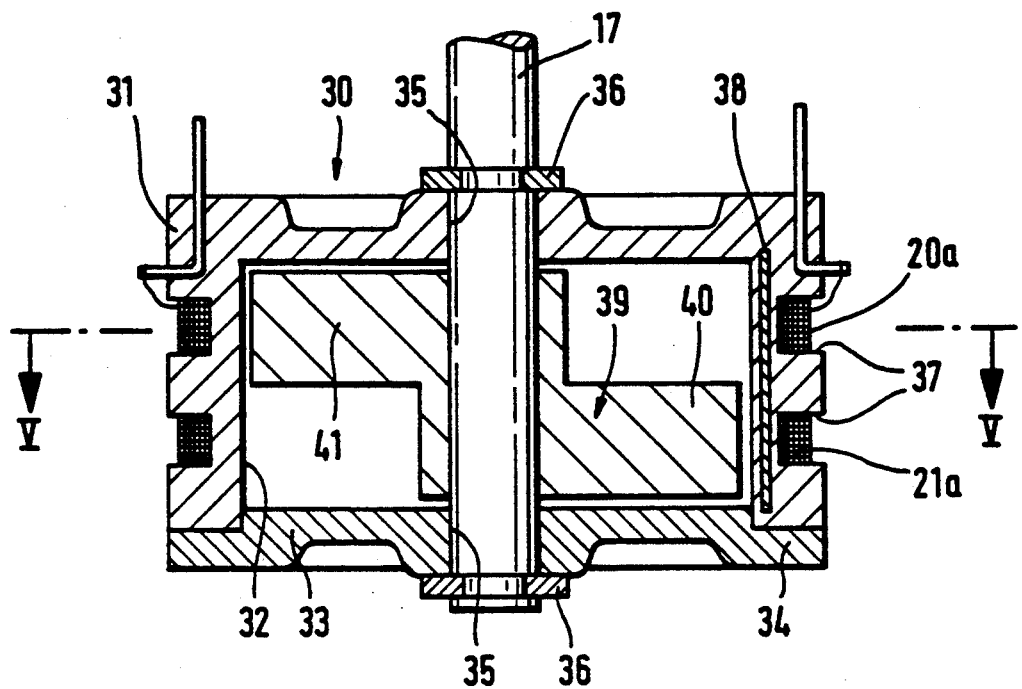
FIG. 4 is a longitudinal cross-sectional view through a second embodiment of a measuring device according to the invention.
Figure 5:
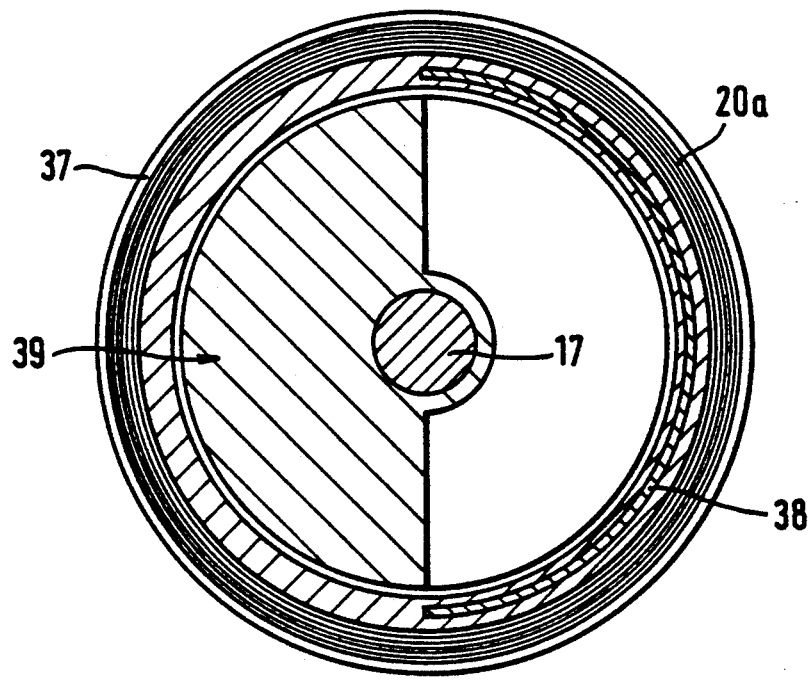
FIG. 5 is a cross-sectional view of the device of FIG. 4 taken along section line V—V of FIG. 4.

In the embodiment example according to FIGS. 4 and 5, the coil body 30 has an approximately cylindrical part 31 with a circular cross section whose opening 32 is closed by a cover 34. In the region of the rotational axis of the coil body 30 of electrical insulating material, e.g. plastic, a bore hole 35 is formed in the base of the part 31 or in the cover 33 in which the shaft 17 is supported. The coil body 30 is fixed in the axial direction on the shaft 17 by two securing devices 36. Two annular grooves 37 are formed in the outer circumferential surface of the coil body 30, in which annular grooves 37 the wire-wound coils 20a, 21a are arranged. The coils 20a, 21a are shielded toward the shaft 17 along a region of approximately 180° by a shielding plate 38 integrated in the coil body 30. A damping element 39 having two cores 40, 41 which are arranged so as to be offset in the axial direction and have an approximately semicircular shape or are D-shaped as seen in cross section are fastened in the interior of the coil body 30 on the shaft 17 so as to be fixed with respect to rotation relative to the latter. Further, the cores 40, 41 are arranged so as to be offset relative to one another by 180° so that the region with the smallest distance between the sensor coils 30 and the circumference of the damping element 37 is located transversely opposite and is accordingly associated with another coil.

Figure 6:
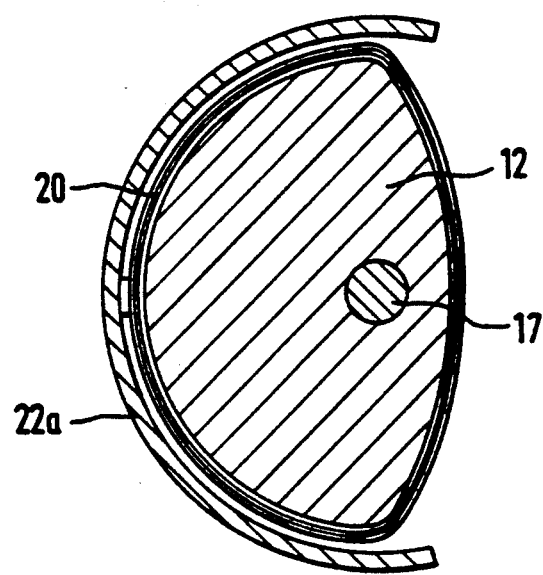
FIG. 6 is a cross-sectional view through a modification of the embodiment according to FIG. 2.

The core 41 is in a working connection with the coil 20a, e.g. as in the position shown in FIG. 4, while the core 40 is prevented from producing a measurement signal in the coil 21a by the shielding element 38. The operation of the embodiment example according to FIG. 4 conforms in an analogous way to that described above. In FIG. 6, the measuring part 22a covers a circular arc α of more than 180°. The measuring part 22a can cover a circular arc α of 180° to 260°. An arc α of 200° to 220° has proven particularly advantageous. This construction of the measuring part 22a also applies in an analogous manner for the shielding plate 38 according to FIGS. 4 and 5.

Of course, it is also possible to use e.g. four or more coils instead of two coils in all the embodiment examples so that smaller measurement angles can be determined. A corresponding number of cores arranged so as to be offset in the axial direction are used for this purpose. With four cores, these cores are then arranged so as to be offset in the radial direction by 90°. A coil is then wound on each of the cores, which coil can be connected e.g. in a Wheatstone bridge circuit.

Figure 2:
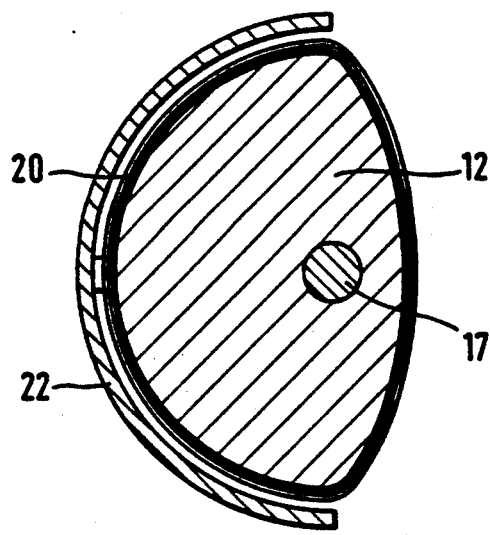
FIG. 2 is transverse cross-sectional view of the device shown in FIG 1 taken along the section line II—II of FIG. 1.
Figure 3:
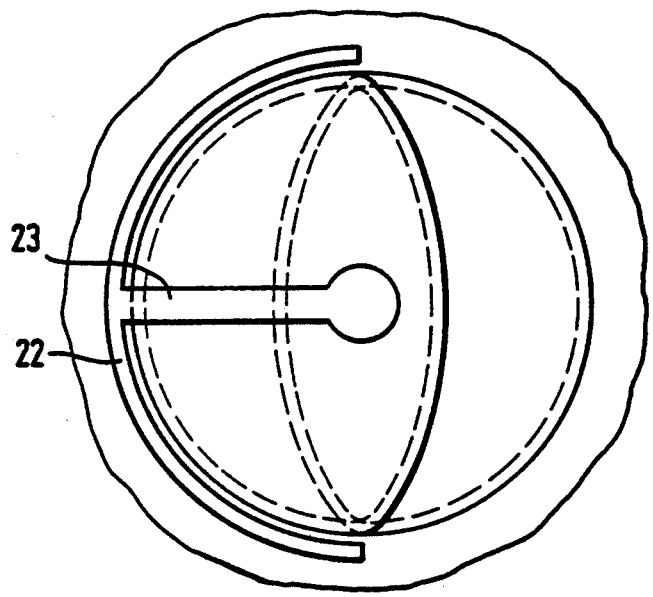
FIG. 3 is a top view of the device of FIG. 1 in a direction A in FIG. 1.

The measuring part 22 and the damping element 39 can carry out a rotating movement of 360°. However, the actual measurement area, e.g. in the embodiment example according to FIGS. 1 to 3, is approximately limited to the tangential length of the coils and continues to repeat in the form of delta voltage as a function of the number of coils (a maximum of approximately 90° with four coils).

While the invention has been illustrated and described as embodied in a measuring device for determining a rotation angle of a shaft relative to a stationary body, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A measuring device for contactless determination of a rotation angle of a shaft comprising a coil body having an outer surface, a circumference and an axial direction and including a plurality of cores offset from each other in the axial direction; a shaft rotatably supported in the coil body and having a rotation angle relative to the coil body, the coil body providing bearing means for the shaft; at least one electrically conducting coil arranged on each of the cores and having an inductance and an alternating current resistance; and a measuring part spaced from and adjacent to the outer surface of and extending circumferentially around at least half the circumference of the coil body, and said measuring part being connected nonrotatably with the shaft so that the measuring part rotates relative to the coil body when the shaft rotates, and said measuring part being at least partially made from a material selected from the group consisting of electrically conductive materials and ferromagnetic materials so that the measuring part induces variations in the inductance and the alternating current resistance of said coils when said measuring part rotates relative to the coil body.

2. A measuring device as defined in claim 1, wherein each of said cores has an approximately D-shaped cross section and surrounds a shaft rotation axis.

3. A measuring device as defined in claim 1, further comprising a holding device stationary relative to the shaft, said coil body being rigidly mounted on the holding device.

4. A measuring device as defined in claim 3, wherein the holding device is a printed circuit board, and further comprising electrical connection pins in the vicinity of the printed circuit board for electrical connection with the coils.

5. A measuring device as defined in claim 1, further comprising at least one retaining ring on the shaft for axially retaining the coil body on the shaft.

6. A measuring device as defined in claim 1, wherein the measuring part is attached to the shaft by a rod-shaped carrier so as to rotate with the shaft.

7. A measuring device as defined in claim 1, wherein the measuring part is attached to the shaft by a disk-shaped carrier so as to rotate with the shaft.

8. A measuring device as defined in claim 1, wherein the disk-shaped carrier has at least one window.

9. A measuring device as defined in claim 1, wherein the coil body is provided with two of the cores and two of the electrically conductive coils on each of the cores, said coils each having a width and a spacing therebetween, and the measuring part has a length in the axial direction greater than the sum of the widths of the coils plus the spacing.

10. A measuring device as defined in claim 1, wherein the measuring part extends circumferentially around the coil body over a circular arc of 180° to 260°.

11. A measuring device as defined in claim 1, wherein the measuring part extends circumferentially around the coil body over a circular arc of from 200° to 220°.

12. A measuring device for contactless determination of a rotation angle of a shaft comprising a coil body having an axial direction; a shaft rotatably supported in the coil body, the coil body providing bearing means for the shaft, and having a rotation angle relative to the coil body and a shaft rotation axis; a plurality of electrically conducting coils on the coil body spaced from each other in the axial direction and having an inductance and an alternating current resistance; a damping body attached nonrotatably to the shaft to rotate with the shaft and having a plurality of cores offset from each other in the axial direction, each of said cores being associated with one of the coils on the coil body; and a shielding plate arranged so as to partially shield the coils on the coil body from the cores of the damping body, wherein the damping body is at least partially made from a material selected from the group consisting of electrically conductive materials and ferromagnetic materials so that the damping body induces variations in the inductance and the alternating current resistance of said coils when said damping body moves relative to said coil body.

13. A measuring device as defined in claim 12, wherein each of said cores has an approximately D-shaped transverse cross section and surrounds the shaft rotation axis.

14. A measuring device as defined in claim 12, further comprising two retaining rings on each side of the coil body axially retaining the shaft in the coil body.

15. A measuring device as defined in claim 12, wherein the coil body is cylindrical with a circular cross section and has an outer circumferential surface provided with a circumferential groove for each of the coils.

16. A measuring device as defined in claim 12, wherein the shielding plate extends circumferentially in the coil body around the coil body over a circular arc of 180° to 260°.

17. A measuring device as defined in claim 12, wherein the shielding plate extends circumferentially in the coil body around the coil body over a circular arc of from 200° to 220°.

* * * * *